INVENTOR
FREDERICK A. LOEBEL
ATTORNEYS

United States Patent Office 3,311,543
Patented Mar. 28, 1967

3,311,543
VAPOR COMPRESSION STILL FOR DISTILLING IMPURE WATER
Frederick A. Loebel, Milwaukee, Wis., assignor to Aqua-Chem, Inc., a corporation of Wisconsin
Filed May 15, 1963, Ser. No. 280,653
4 Claims. (Cl. 202—160)

This invention relates to methods and apparatus for removing impurities from liquids and more particularly to improvements in a method and in an apparatus for purifying water.

It is the general object of the present invention to provide an improvement in the purification of liquids such as water.

It is a more specific object of the present invention to provide for the production of hot and/or cold pure water from impure water such as brackish water in a new and useful manner and using new and useful apparatus. A further obejct is to provide such apparatus and method with control for the production of hot and/or cold water.

A more specific object is to provide an apparatus or method in accordance with the foregoing objects wherein the product water may be heated and/or cooled by heat exchange with a fluid used to supply heat and extract heat for vaporization and for condensation respectively of water within the purifier system.

Other objects of the present invention will be readily apparent from the following description and drawings in which.

Figure 1:
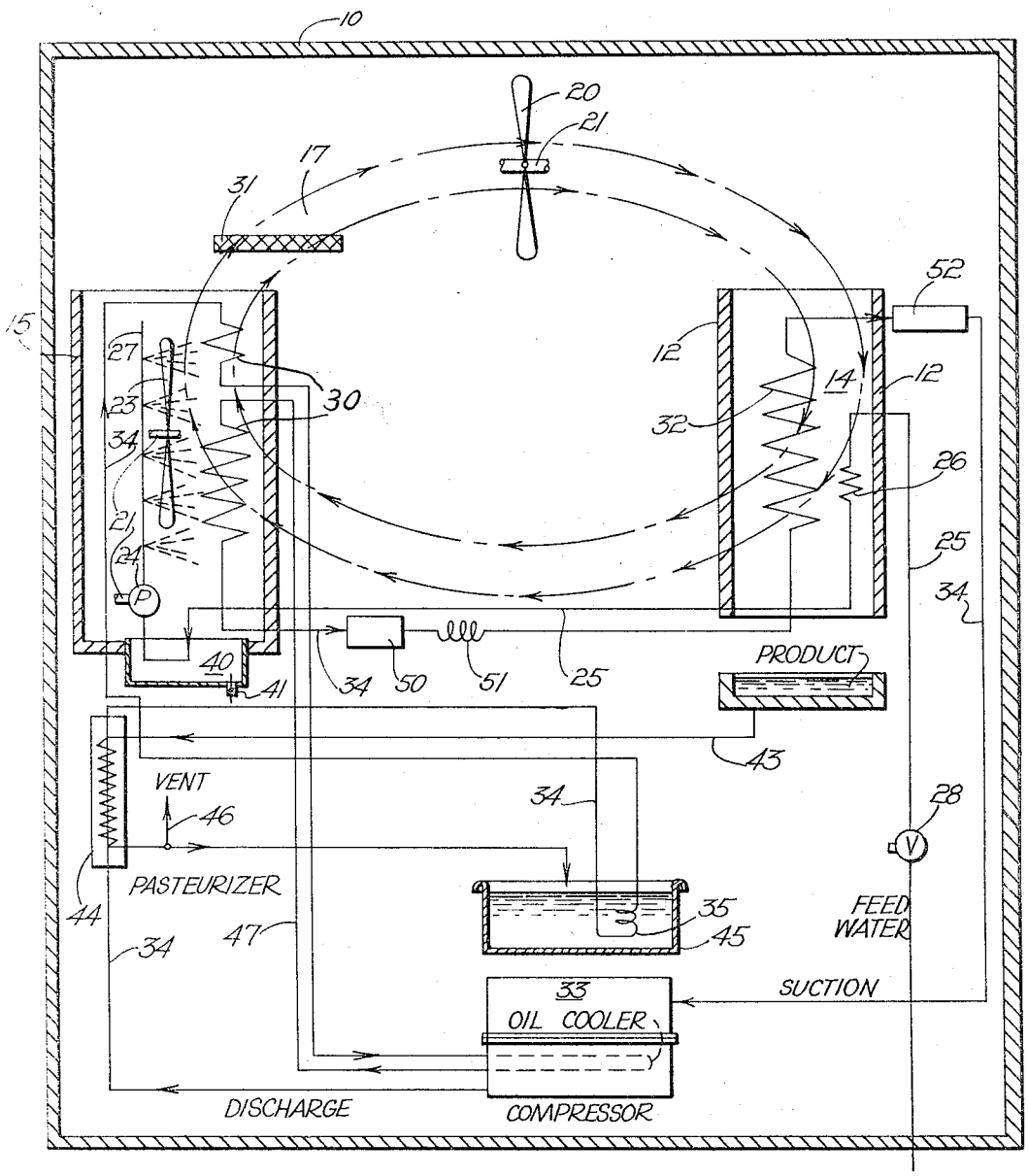
FIGURE 1 is a schematic diagram, including flow, of a system embodying the present invention.

While this invention is susceptible of embodiment in many different forms, there is shown in the drawings and will herein be described in detail an embodiment and modification thereof, with the understanding that the present disclosure is to be considered as an exemplification of the principles of the invention and is not intended to limit the invention to the embodiment illustrated.

Recently it has been proposed to purify water by introducing water vapor from the water to be purified into a cyclic stream of air which is directed and recycled between a water vaporization zone and a water condensation zone, the cycle of air picking up water in the vaporization zone and depositing condensed purified water in the condensing zone. The purified water may be withdrawn as such from the condensing zone. Apparatus for such purification is described by E. T. Morton in application Ser. No. 239,396, entitled, Method and Apparatus for Purifying Liquids, and filed Nov. 16, 1962, to which reference may be made if desired for more particular structural details of apparatus described herein.

The present invention deals with an improvement in such a system whereby a supply of hot water may be produced if desired, or wherein either hot or cold water may be selectively produced. The system may be controlled automatically with respect to conditions of the product water. In an advantageous aspect, the system may be adapted for control for production of hot or cold water with the heating means for heating the vaporization zone being used to heat the hot product water; the cooling means for cooling the condensation zone may be used to cool cold product water. In a specific and preferred form of the invention, refrigerant is used to heat the vaporization zone and cool the condensation zone, the refrigerant being compressed prior to passage in heat exchange with the vaporization zone and being expanded or vaporized prior to passage in heat exchange with the condensing zone, and the refrigerant is diverted through product water after compression thereof to heat product water and may also be diverted through product water, after expansion thereof, to cool the product water.

Figure 2:
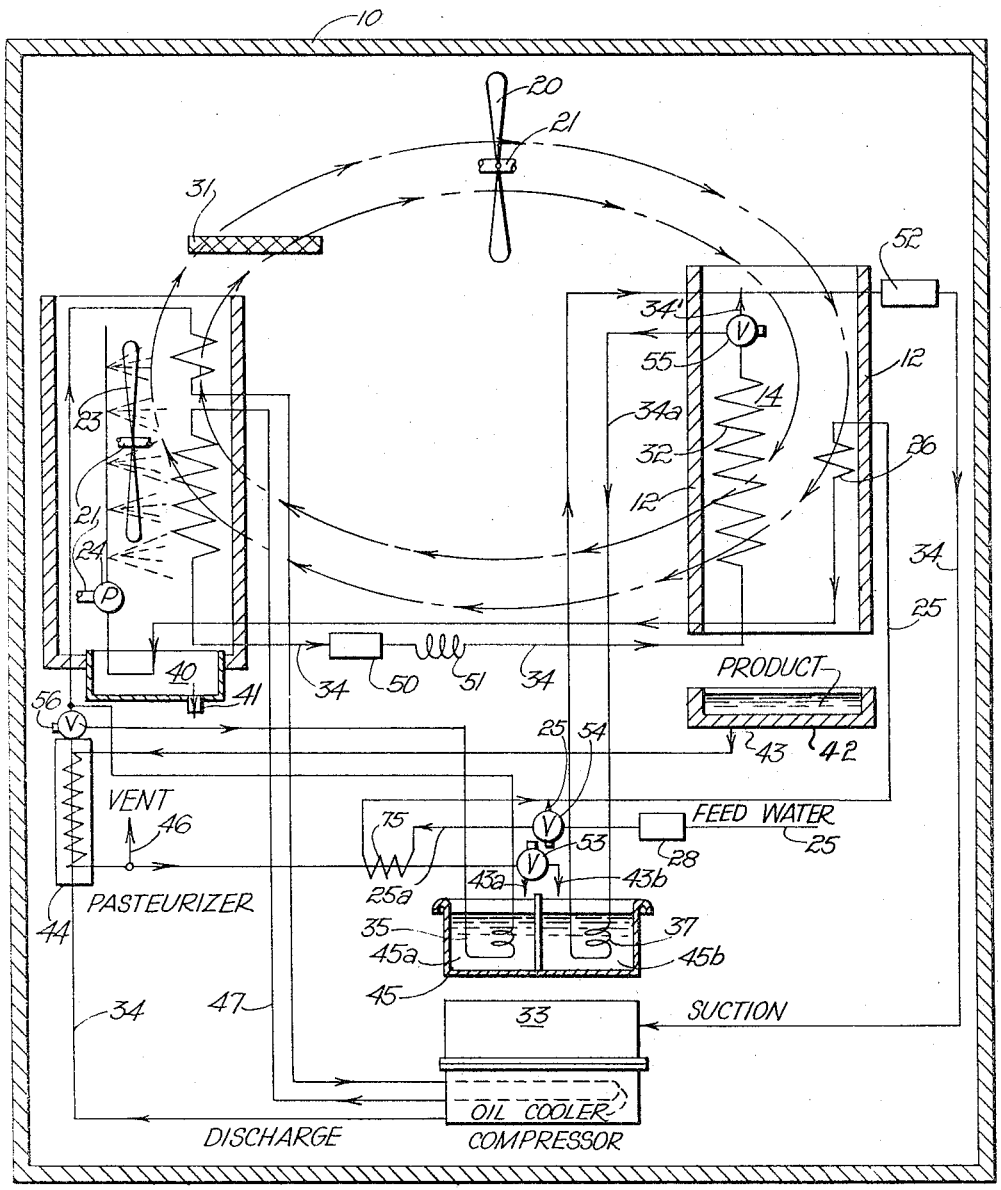
FIGURE 2 is a schematic flow diagram illustrating still another system embodying the present invention.

Referring to the drawings generally and with particular reference to FIGS. 1 and 2, in a water purifier of the type represented, there is provided an enclosure 10 containing a water vaporizing chamber or zone 11 with walls 12 surrounding and defining chamber 11. Chamber 11 has open upper and lower ends. A water condensing zone or chamber 14 is also provided defined by walls 15 and also has upper and lower open ends. Chambers 11 and 14 may be cylindrical and disposed concentrically, e.g., with chamber 11 as an inner chamber and chamber 14 as an outer chamber. A cyclic stream of air indicated generally by reference numeral 17 is provided during operation of the device for circulating air between the water vaporizing chamber 11 and water condensing chamber 14 and return to chamber 11. For such circulation, an air blower blade 20 secured to a driven shaft 21 forces air clockwise as viewed in FIGS. 1 or 2. Motor 22 is shown schematically (FIG. 3) for driving shaft 21. Also mounted on shaft 21 and driven therewith are impeller 23 and pump 24.

A water feed supply line 25 is provided for supplying water to be purified to the purifying device. Supply line 25 directs the feed water in heat exchange with the condensing chamber through heat exchanger 26 and the water is thereafter pumped by pump 24 for discharge through a spray means such as sprinkler tube 27 in the vaporizing zone 11. Valve 28 controls the supply of feed water, the valve being a solenoid valve actuated to open.

In vaporizing zone 11 there is provided a heating element in the form of heat exchange tube or coil 30 through which hot refrigerant is circulated. Spray tube 27 directs a spray of water on heating element or coil 30 in the vaporizing zone for introduction of the water vapor into the cyclic stream of air 17 passing through zone 11. At the outlet from zone 11 a filter or demister 31 is provided to filter droplets of water from the circulating stream. Thence, the circulating stream carries the water vapor into condensing zone 14 where it is passed in heat exchange with a cooling element or cooling coil 32 through which cold refrigerant is passed.

The refrigerant is generally circulated between the two zones through line 34 and is compressed in the circulation by means of compressor 33. Also within the refrigerant circuit is a product water heating coil 35 (FIGS. 1 and 2) for providing hot product water and a product water cooling coil 37 (FIG. 2 only) for providing cold product water supply. With the device generally in operation, motor 23 drives shaft 21, fan 20, impeller 22 and pump 24 and water is sprayed on the heating coils in zone 11. Water dripping from the coil 30 is caught in tray 40 for discharge through drain 41 and contains the bottoms from the vaporization zone, including a more concentrated brine solution where brine is used as the feed water. In zone 14, the water vapor is condensed and the product water is collected in a product collection tray or tank 42 and discharged by line 43 through pasteurizer 44 to product storage tank 45, tank 45 functioning as a fresh water supply tank and fresh water may be withdrawn therefrom for use.

The embodiment illustrated by the flow scheme of FIG. 1 produces only a hot water supply. The system of FIG. 1 employs a refrigeration cycle for heating and cooling the cyclic stream of air and has been modified particular for use in home or other low hot water requirement installations.

In the system of FIG. 1, feed water is charged through line 25 to an atomizer or spraying means in the form of sprinkler tube 27. The passage of feed water through line 25 is controlled by flow control solenoid valve 28 which functions in response to conditions of product water as will be described hereinbelow. Valve 28 may be manually operable if desired.

Upon opening of valve 28 for passage of feed water to the water purifier, the water passes through heat exchanger 26 is heat exchange with the cyclic stream of air flowing through the evaporator chamber and it is then charged to the water spray tube 27 which sprays the water upon coil 30.

The water vapors are picked up in chamber or zone 11 by the cyclic stream of air, carried through demister 31 and into chamber 14 wherein the water is condensed and collected as product with the cyclic stream of air returning to chamber 11.

The collected water is withdrawn by means of line 43 and passed through a pasteurizer or heat exchanger 44 wherein the water is pasteurized or heated to a temperature sufficient to kill any pathogenic organisms or undesirable bacteria which may be present, e.g., 140–212° F. Vent 46 is provided to vent gases or vapors driven off by virtue of the heating of the collected water, thereby removing undesirable tastes or odors which may be present in the water. The product water is thereafter passed into storage tank 45 from which the water can be withdrawn for use, e.g., as drinking water, as desired.

In the refrigeration cycle, the refrigerant is compressed by compressor 33 and charged through line 34, pasteurizer 44, and product water heating coil 35 to coil 30. Coil 35 is in tank 45 in the system of FIG. 1 and is in compartment 45a of tank 45 in FIG. 2. Coil 35 heats the water surrounding it to provide a product hot water supply. The hot refrigerant provides the heat source for pasteurizer 44 and tank 45. In coil 30, the refrigerant causes vaporization of the water sprayed against the coil in chamber 11. An intermediate tap in coil 30 directs partially condensed refrigerant to the compressor through line 47 to the compressor to pick up heat from the oil reservoir and thence back to coil 30.

From coil 30, the refrigerant is passed through dryer 50, which is a desicant type dryer including a chemical, e.g. silica gel, capable of removing moisture from the refrigerant in the sealed refrigerant circuit. Moisture tends to create corrosion problems when present with refrigerants and the corrosion problems is decreased by such drying of the refrigerant. Thereafter, the refrigerant is passed through restriction 51 and evaporated and directed through coil 32 for cooling and condensing water from the cyclic stream of air.

In the system of FIG. 2, from coil 32, the refrigerant is diverted through cooling coil 37 disposed within product storage tank compartment 45b (separated from compartment 45a) for cooling the product water, e.g. to drinking temperature. The refrigerant is then returned to accumulator 52 which serves as a storage tank for refrigerant. Refrigerant is withdrawn from accumulator 52 and circulated through line 34 to the inlet or suction side of compressor 33 wherein the refrigerant is compressed and discharged for recycle.

The device of FIGURE 2 is operable to alternately produce hot or cold water. For taking advantage of proper heat exchange features for such purposes, a series of solenoid valves 53 through 56 are provided in the circuitry. Valve 53 is usable to selectively divert the product water from line 43 to either of hot water compartment 45a or cold water compartment 45b of tank 45. Valve 53 in its normal deactuated position diverts the water through line 43a to compartment 45a and upon actuation diverts the water through line 43b to compartment 45b. Valve 54 in deactuated position diverts feed water in line 25 through line 25a and heat exchanger 75 where the feed water passes in heat exchange with product water in line 43; in actuated position, solenoid valve 54 directs water through line 25 directly to the heat exchanger 26. Valve 55 normally diverts refrigerant through line 34' and cooling coil 37 but upon actuation by-passes cooling coil 37 and directs the refrigerant in line 34' directly to accumulator 52 from condensing coil 32. Valve 56 in unactuated position directs refrigerant in line 34 from pasteurizer 44 through evaporation zone coil 30 and in actuated position diverts the heat exchange fluid or refrigerant through coil 35 prior to its passage to coil 30. Thus, when all of solenoids 53 through 56 are de-energized, the device produces cold water in compartment 45b and when all of valves 53 and 56 are energized, the device produces hot water in compartment 45a. In the system of FIGURE 1, the device is adapted for the production of hot water only and valves 53 through 56 are not included, there being no selection between hot and cold water.

The barrier between compartments 45a and 45b may be removed if desired where only water of one temperature is needed. Preferably, where used, the barrier between the two compartments is an insulating material.

The water purifying device has been adapted for use in purification of hard water feed and accordingly uses lower operating temperatures in order to avoid scaling. The compressed refrigerant charged through line 34 to coil 30 is at a temperature of about 195° F. while the condensing refrigerant in coil 30 is at a temperature of about 120° F. and the evaporating refrigerant in coil 32 is at a temperature of about 45° F. (FIGURE 2). The heated air-water vapor mixture leaving chamber 11 is at about 115° F. while the cooled air-water vapor mixture leaving chamber 14 is at about 90° F.

Where cooling coil 37 is not provided, e.g. as in FIGURE 1, the operating conditions would probably provide the refrigerant at about 80° F. leaving restriction 51.

Figure 3:
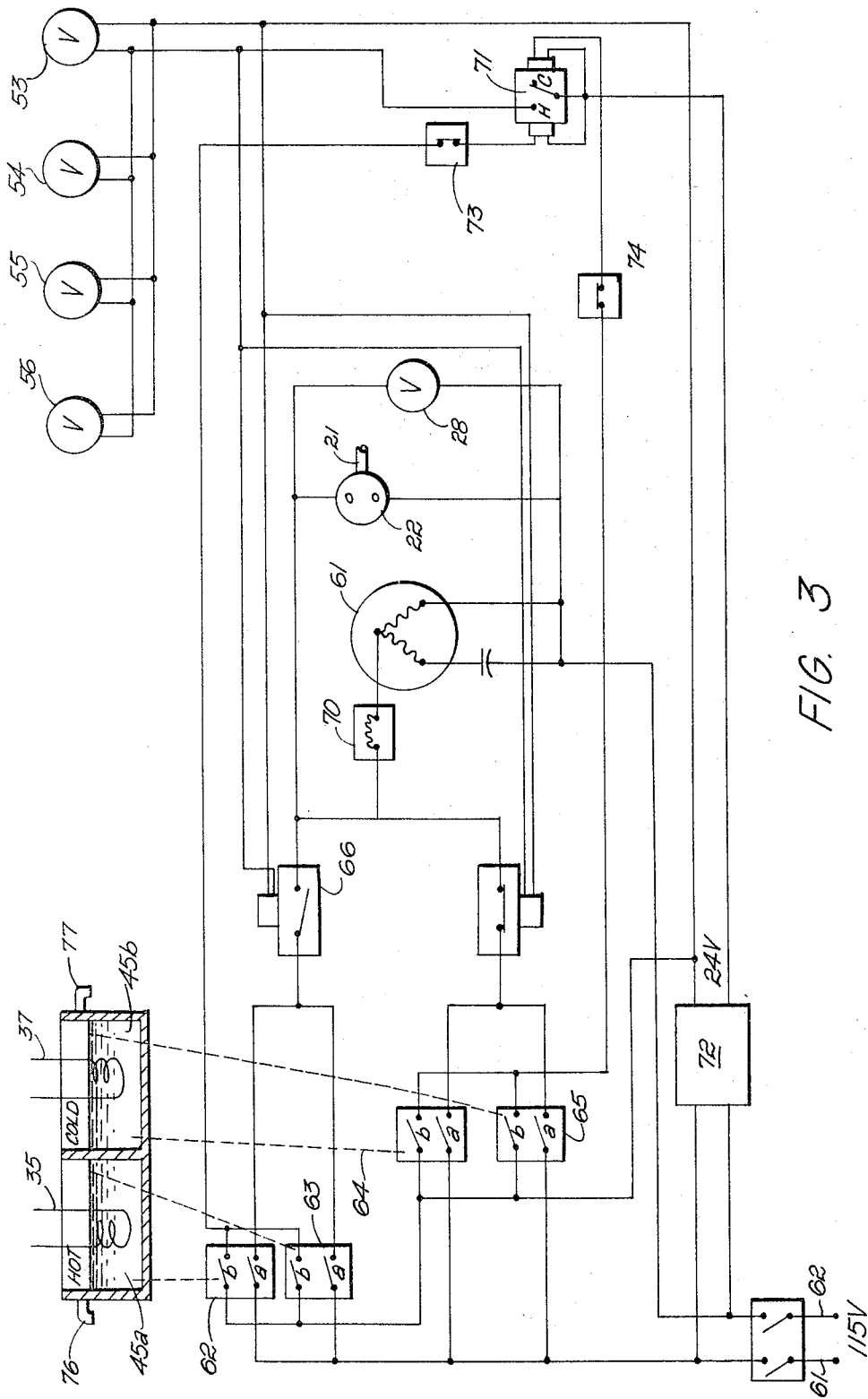
FIGURE 3 is a wiring diagram of suitable electric circuitry for use, for example, in the system of FIGURE 2.

FIGURE 3 illustrates suitable wiring and control features useful in a system of this invention such as illustrated in FIGURE 2.

The illustrated circuit is energized by a 115 volt alternating current source, as indicated, by means of "on-off" DPDT switch 60. Closing switch 60 places the compressor motor 61 and spray and fan motor 22 and valve 28 in circuitry to be controlled by either of switches 62 and 63 or 64 and 65, closure of the lower contact a of any switch 62 through 65 effecting energization of motors 22 and 61, depending on the condition (open or closed) of solenoid switches 66 and 67. Switches 62 and 64 are conventional temperature responsive switches which are actuated to close or open the circuit responsive to the temperature of the product in storage tank sections 45a and 45b, respectively. Switches 63 and 65 are conventional pressure responsive switches which are actuated to open or close the circuit responsive to the level of water in tank compartments 45a and 45b, respectively. Such switches are well known to the art and may be used in accordance with conventional application of such switches. Valve 28 is a conventional normally closed solenoid valve which is opened upon actuation. The compressor motor 61 is also a conventional item and in the illustrated embodiment is an electric motor having a heavy starting load and provided with an overload circuit breaker 70.

Solenoid swiches 66 and 67 are adapted to be actuated by movement of a selector switch 71 to "hot" position. Switch 66 is normally open and actuated to close while switch 67 is normally closed and actuated to open. Thus, while selector switch 71 is in "hot" position, switch 66 is closed and switch 67 is open and when selector switch 71 is in "cold" position, switches 66 and 67 are open and closed respectively as illustrated in FIGURE 3. Selector switch 71 is both manually positionable and solenoid operable. For automatic operation of switch 71, i.e. for solenoid operation, when contacts b of any of switches 62 through 65 are closed, denoting improper temperature or improper level of water in either of compartments 45a or 45b, switch 71 is actuated automatically. Closure of either of contacts 62b or 63b actuates switch 71 to "hot" position while closure of either of contacts 64b or 65b moves the switch to "cold" position.

Also provided are manually operable switches 73 and 74 which are "discontinue hot" and "discontinue cold" switches respectively. Opening of switch 73 breaks the control from level and temperature responsive switches 62 and 63 and opening of switch 74 similarly breaks control of switch 70 by contacts 64b and 65b.

Transformer 72 supplies power through switch 71 for energization of solenoid switches 66 and 67 and controls valves 53 through 56. Movement of switch 71 to "hot" position actuates valves 53 through 56 causing valve 53 to direct product water into tank compartment 45a rather than 45b, valve 54 to divert feed water in line 25 so as to by-pass heat exchanger 75 and go directly to heat exchanger 26, valve 55 to divert cold refrigerant directly to accumulator 52 without passing through coil 37, and valve 56 to direct hot refrigerant through coil 35 prior to passage through coil 30.

The diversion of feed water away from heat exchanger 75 eliminates the absorption of heat from the product water by feed water, which would otherwise occur in heat exchanger 75; with switch 71 in "hot" position, it is desired that the product water be maintained at the higher temperature rather than cooling by heat exchange with the feed water, putting a lesser heating requirement on coil 35.

It will be apparent that the circuitry illustrated, with both of switches 73 and 74 in closed position, is adapted to automatically turn the water purifier device on and off in response to water level or water temperature in either of compartments 45a or 45b. Thus, as the water in either compartment decreases below a minimum preselected range of water supply level for the compartment, the purifying device is actuated by either of switches 63 or 65 through switch 71 to purify more water. Upon production of water in amounts to bring the compartment level up to a predetermined level, usually above the minimum level, switch 63 or 65 opens resulting in de-energization of the device. Additionally, where it is desired to maintain the temperature of the water in either compartment for such purposes as use as drinking water, bath water or the like, upon increase of the water in compartment 45a below a preselected minimum desired temperature or upon increase of the temperature of the water in compartment 45b above a preselected maximum desired temperature or temperature range, switch 62 or 64 is closed and the purifier device is actuated to heat the water by means of coil 35 or cool the water by means of coil 37 or both. When the temperature in either or both compartments becomes adjusted to the desired temperature (or a preselected temperature above the preselected minimum or below the preselected maximum), the device is de-energized. Although additional water is being processed during the cooling or heating of water responsive to the closure of switches 64 and 62, such additional water need not pose a problem for storage tank 45 in that the storage tank is provided in each compartment with overflow means indicated schematically at 76 and 77 so that excess water is discharged to waste or drainage or recycled to feed water as may be desired.

When it is desired to provide only hot water, switch 74 may be opened and the device is responsive to control only for the production of hot water and conversely where it is desired to produce only cold water switch 73 may be opened and the device is responsive for production of cold water only.

With both switch 73 and 74 open, it will be apparent that switch 71, which is manually operable, may be used to manually select either hot or cold water for production.

Although the refrigerant cycle has been used for heating product water in the form of the invention discussed with reference to the drawings, the hot water product may be provided and maintained by employing a heat source which is external to the refrigerant system. For example, another heat source such as an electric immersion coil with a temperature responsive "on-off" switch may be used in lieu of heating coil 35 or as a supplemental heater in combination with coil 35.

I claim:

1. An apparatus for purifying water which comprises compressor means for compressing a refrigerant, means for circulating the compressed refrigerant into heat exchange with water to be purified in a water vaporization zone for heating the water, means for expanding said refrigerant after passage through the water vaporization zone, means for directing the expanded refrigerant in heat exchange with a water condensing zone for cooling the water condensing zone, means for recycling the expanded refrigerant to the compressor for recompression, means providing a current of air moving from the water vaporizing zone to the water condensing zone for vaporizing the water to be purified in the vaporizing zone, means for separating condensed product water from the condensing zone into at least two bodies, means directing compressed refrigerant through one of said bodies in heat exchange therewith for providing a body of hot water, means directing expanded refrigerant into heat exchange with the other of said bodies to cool said body and provide a body of cold water, an accumulator for storing refrigerant, and means comprising a series of solenoid actuated valves connected in circuitry with the compressor for selectively by-passing the respective heat exchangers associated with the respective bodies of hot and cold water, and means responsive to a preselected level and a preselected temperature of each of said two bodies to actuate the series of solenoid actuated valves.

2. Apparatus for purifying water which comprises means for compressing a refrigerant, heat exchange means for the compressed refrigerant into heat exchange with a water vaporization zone for heating said vaporization zone, means for expanding said refrigerant downstream from said vaporization zone, heat exchange means for passing the expanded refrigerant in heat exchange with a water condensing zone for cooling the water condensing zone, a recycle conduit for recycling the expanded refrigerant to the compressing means, means providing a current of air moving from the water vaporizing zone to the water condensing zone, spray means for introducing water as a spray into the air in the vaporizing zone, means for separating condensed product water from the condensing zone into two bodies, means for circulating the refrigerant subsequent to compressing and prior to expansion thereof through one of said bodies in heat exchange therewith for providing a body of hot water, and means for circulating the refrigerant after expansion and prior to recompression thereof into heat exchange with the second of said bodies to cool said body and provide a body of cold water, means comprising a series of solenoid actuated valves connected in circuitry with the compressor for selectively by-passing the respective heat exchangers associated with the respective bodies of hot and cold water, and means responsive to a preselected level and a preselected temperature of each of said two bodies to actuate the series of solenoid actuated valves.

3. An apparatus for purifying water which comprises compressor means for compressing a refrigerant, heat exchange means for passing the compressed refrigerant into heat exchange with a spray of water in a water vaporization zone, means for releasing compression of said refrigerant, heat exchange means for directing the refrigerant from said compression releasing means into heat exchange with air passing through a water condensing zone, conduit means for recycling the refrigerant to the compressor, means providing a current of air moving from within the water vaporization zone through the water condensing zone, spray means for introducing water as a spray into the air in the vaporization zone directed upon the first mentioned heat exchange means, means for recovering product water from the condensing zone in at least two separate bodies, heat exchange means for circulating said refrigerant from said compressor means in heat exchange with at least one of said bodies for providing a body of hot water, heat exchange means for circulating said refrigerant from said compression releasing means in heat exchange with the second of said bodies to cool said body and provide a body of cold water, an accumulator for storing refrigerant, and means comprising a series of solenoid actuated valves connected in circuitry with the compressor for selectively by-passing the respective heat exchangers associated with the respective bodies of hot and cold water, and means responsive to a preselected level and a preselected temperature of each of said two bodies to actuate the series of solenoid actuated valves.

4. An apparatus for purifying water which comprises means maintaining a recirculating flow of refrigerant between water vaporizing and water condensing zones as a heat exchange fluid traveling through each of said zones including compressor means for compressing the refrigerant prior to entry into the vaporizing zone and expansion valve means for releasing compression of the refrigerant prior to entry into the condensing zone, means maintaining a recirculating stream of air between the water vaporizing and condensing zones in heat exchange with the flow of refrigerant in both zones, spray means for introducing water vapor from the water to be purified into the moving stream of air in the vaporizing zone, means for collecting condensed water from the condensing zone, first flow diverting means for diverting refrigerant under compression from the recirculating flow thereof through a first portion of collected water and return for providing a body of hot water, second flow diverting means for diverting refrigerant from the recirculating flow downstream from said expansion valve means through a second portion of collected product water and return for providing a body of cold water, selection means for selecting either of said flow diverting means to divert refrigerant from the recirculating flow, an accumulator for storing refrigerant, and means comprising a series of solenoid actuated valves connected in circuitry with the compressor for selectively by-passing the respective flow diverting means associated with the respective bodies of hot and cold water, and means responsive to a preselected level and a preselected temperature of each of said two bodies to actuate the series of solenoid actuated valves.

References Cited by the Examiner

UNITED STATES PATENTS

| | | | |
|---|---|---|---|
| 614,776 | 11/1898 | Stocker | 203—10 X |
| 2,018,049 | 10/1935 | Allen | 202—236 |
| 2,441,361 | 5/1948 | Kirgan | 202—181 |
| 2,751,761 | 6/1956 | Borgerd | 62—238 |
| 2,885,328 | 5/1959 | Williamson | 202—167 |
| 3,039,941 | 6/1962 | Sweeney et al. | 202—185.3 |
| 3,218,241 | 11/1965 | Checkovich. | |

FOREIGN PATENTS

K–24,930   12/1956   Germany.

NORMAN YUDKOFF, *Primary Examiner.*

F. DRUMMOND, *Assistant Examiner.*